US010152467B2

(12) United States Patent
Chan et al.

(10) Patent No.: US 10,152,467 B2
(45) Date of Patent: Dec. 11, 2018

(54) MANAGING A SHARING OF MEDIA CONTENT AMONG CLIENT COMPUTERS

(75) Inventors: Kelvin Chan, New York, NY (US); Yiyang Joy Ding, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 531 days.

(21) Appl. No.: 13/572,902

(22) Filed: Aug. 13, 2012

(65) Prior Publication Data
US 2014/0047022 A1   Feb. 13, 2014

(51) Int. Cl.
*G06F 15/16* (2006.01)
*G06F 17/24* (2006.01)
(Continued)

(52) U.S. Cl.
CPC ......... *G06F 17/241* (2013.01); *G06Q 10/101* (2013.01); *H04L 12/1822* (2013.01)

(58) Field of Classification Search
CPC ...... G06Q 10/101; G06Q 10/10; H04L 29/06; H04L 29/0809; H04L 29/06027; H04L 65/1089; H04L 65/4015; H04L 65/403; H04L 65/4076; H04L 67/18; H04L 65/4046; H04L 12/1818; H04L 41/22; H04N 21/2187; H04N 21/47205; H04N 7/15; H04N 19/162; H04N 19/172;
(Continued)

(56) References Cited

U.S. PATENT DOCUMENTS 5,944,791 A * 8/1999 Scherpbier .................... 709/218
6,173,317 B1 * 1/2001 Chaddha ........... G06F 17/30056
348/E7.063
(Continued)

FOREIGN PATENT DOCUMENTS

CN   102272711   12/2011
WO   99/46702 A1   9/1999
(Continued)

OTHER PUBLICATIONS

International Searching Authority, "Notification of Transmittal of the International Search Report and the Written Opinion of the International Search Authority, or the Declaration," for International Application No. PCT/US2013/054794, dated Mar. 18, 2014, 12 pages.
(Continued)

*Primary Examiner* — Sm A Rahman
*Assistant Examiner* — Ranjan Pant
(74) *Attorney, Agent, or Firm* — Lowenstein Sandler LLP

(57) ABSTRACT

Technology is provided to manage sharing of media content among client computers. In one example, an application server provides at least a portion of the media content to the client computers. The application server receives a requested session event. A session event is an annotation, a comment, or a navigation request. The application server generates a formatted session event by formatting the requested session event at least according at least one option. An option defines how the application server is to modify a session event for display at the client computers. The application server provides the formatted session event to the client computers for display on user interfaces at the client computers. This Abstract is submitted with the understanding that it will not be used to interpret or limit the scope or meaning of the claims.

24 Claims, 9 Drawing Sheets

(51) Int. Cl.
*G06Q 10/10* (2012.01)
*H04L 12/18* (2006.01)

(58) Field of Classification Search
CPC .. H04N 19/46; H04N 21/6125; H04N 21/431; H04N 5/765; H04N 7/147; H04N 9/8205; G06F 17/30017; G06F 17/30817; G06F 3/04883; G06F 17/30525; G06F 17/241; G06F 2203/0381; G06F 3/04817; G06F 3/04842; G06F 3/0488; G06F 17/30038; G06F 17/3061; G06F 17/30914; G06F 17/30997; G06F 3/048; Y10S 707/913
See application file for complete search history.

(56) References Cited

U.S. PATENT DOCUMENTS

| | | | | |
|---|---|---|---|---|
| 8,020,104 | B2* | 9/2011 | Robarts | G06F 1/163 706/45 |
| 8,140,973 | B2* | 3/2012 | Sandquist | G06F 17/30781 704/270 |
| 8,255,552 | B2* | 8/2012 | Witt | G06F 17/30017 709/204 |
| 8,918,722 | B2* | 12/2014 | Sitrick | G06F 17/241 715/751 |
| 2002/0059342 | A1* | 5/2002 | Gupta | G06F 17/241 715/233 |
| 2002/0075303 | A1 | 6/2002 | Thompson et al. | |
| 2004/0249885 | A1* | 12/2004 | Petropoulakis | G06F 9/54 709/204 |
| 2005/0198202 | A1* | 9/2005 | Yamamoto | G06F 17/2247 709/218 |
| 2006/0004680 | A1* | 1/2006 | Robarts | G06F 1/163 706/12 |
| 2006/0015763 | A1 | 1/2006 | Nakajima | |
| 2006/0087987 | A1* | 4/2006 | Witt | G06F 17/30017 370/260 |
| 2007/0200921 | A1* | 8/2007 | Horikiri | H04N 7/15 348/14.08 |
| 2008/0028323 | A1* | 1/2008 | Rosen | G06Q 10/10 715/752 |
| 2008/0091778 | A1* | 4/2008 | Ivashin | G06Q 10/10 709/204 |
| 2008/0126953 | A1* | 5/2008 | Davidson | G06Q 10/10 715/753 |
| 2008/0201420 | A1 | 8/2008 | Wong et al. | |
| 2008/0288494 | A1* | 11/2008 | Brogger | G06Q 30/02 |
| 2009/0077170 | A1* | 3/2009 | Milburn | G06F 19/3426 709/203 |
| 2009/0300475 | A1* | 12/2009 | Fink | G06F 17/3082 715/230 |
| 2010/0165396 | A1* | 7/2010 | Yamaguchi | G06Q 10/10 358/1.15 |
| 2010/0257449 | A1* | 10/2010 | Lieb | G06Q 10/10 715/730 |
| 2010/0278453 | A1* | 11/2010 | King | G06Q 10/10 382/321 |
| 2011/0249954 | A1* | 10/2011 | Meek | H04N 5/772 386/239 |
| 2012/0002889 | A1* | 1/2012 | Blose | G06K 9/3275 382/229 |
| 2012/0117153 | A1* | 5/2012 | Gunasekar | G06F 17/289 709/204 |
| 2012/0231441 | A1* | 9/2012 | Parthasarathy | G09B 7/02 434/362 |
| 2013/0027425 | A1* | 1/2013 | Yuan | G06F 3/0484 345/629 |
| 2013/0152152 | A1* | 6/2013 | Benyola | H04N 21/25891 725/153 |

FOREIGN PATENT DOCUMENTS

| | | |
|---|---|---|
| WO | 1999046702 | 9/1999 |
| WO | 2010080260 | 7/2010 |

OTHER PUBLICATIONS

The State Intellectual Property Office of the People's Republic of China, "Notification of First Office Action" for Chinese Application No. 201380052112.5, dated Oct. 9, 2016, 22 pages.

European Patent Office, "Supplementary European Search Report" for European Application No. 13829424.4, dated Jun. 28, 2016, 7 pages.

\* cited by examiner

MANAGING A SHARING OF MEDIA CONTENT AMONG CLIENT COMPUTERS

BACKGROUND

Field of the Invention

The subject matter described herein relates to managing the sharing of media content among multiple computers.

Background Information

Some cloud computing websites have video delivery services. A common feature of these websites is the ability to attach annotations to a video according to time markers. A viewer may later replay the video with annotations attached according to the time markers.

SUMMARY

A technology is provided to manage sharing of media content (e.g., a presentation, a video, etc.) among a plurality of client computers. For example, an application server provides (e.g., multicasts) at least a portion of the media content from an application server to the client computers. The client computers are coupled for communicating in a collaboration session for the media content. The application server receives, from a client computer, a requested session event. A session event may include, for example, an annotation associated with the media content, a comment associated with the media content, and/or a navigation request associated with the media content. The application server generates a formatted session event by formatting the requested session event according to at least one option. An option defines how the application server is to modify a session event for display at the client computers. The application server provides (e.g., multicasts) the formatted session event to the client computers for display on user interfaces at the client computers.

BRIEF DESCRIPTION OF THE DRAWINGS

Implementations described herein will be readily understood by the following detailed description in conjunction with the accompanying drawings.

DETAILED DESCRIPTION

Conventional websites do not enable multiple people to share annotations and/or comments during a joint viewing session of media content (e.g., a presentation, a video, etc.). To address this problem, the present technology provides a cloud computing architecture for multiple people to share annotations and/or comments during a joint viewing session of media content. This system may be implemented on any website that provides delivery services for presentations and/or videos. The system is particularly suited for an application server that can provide (e.g., multicast) a presentation and/or a video to multiple client computers over the Internet.

General Overview

Figure 1:
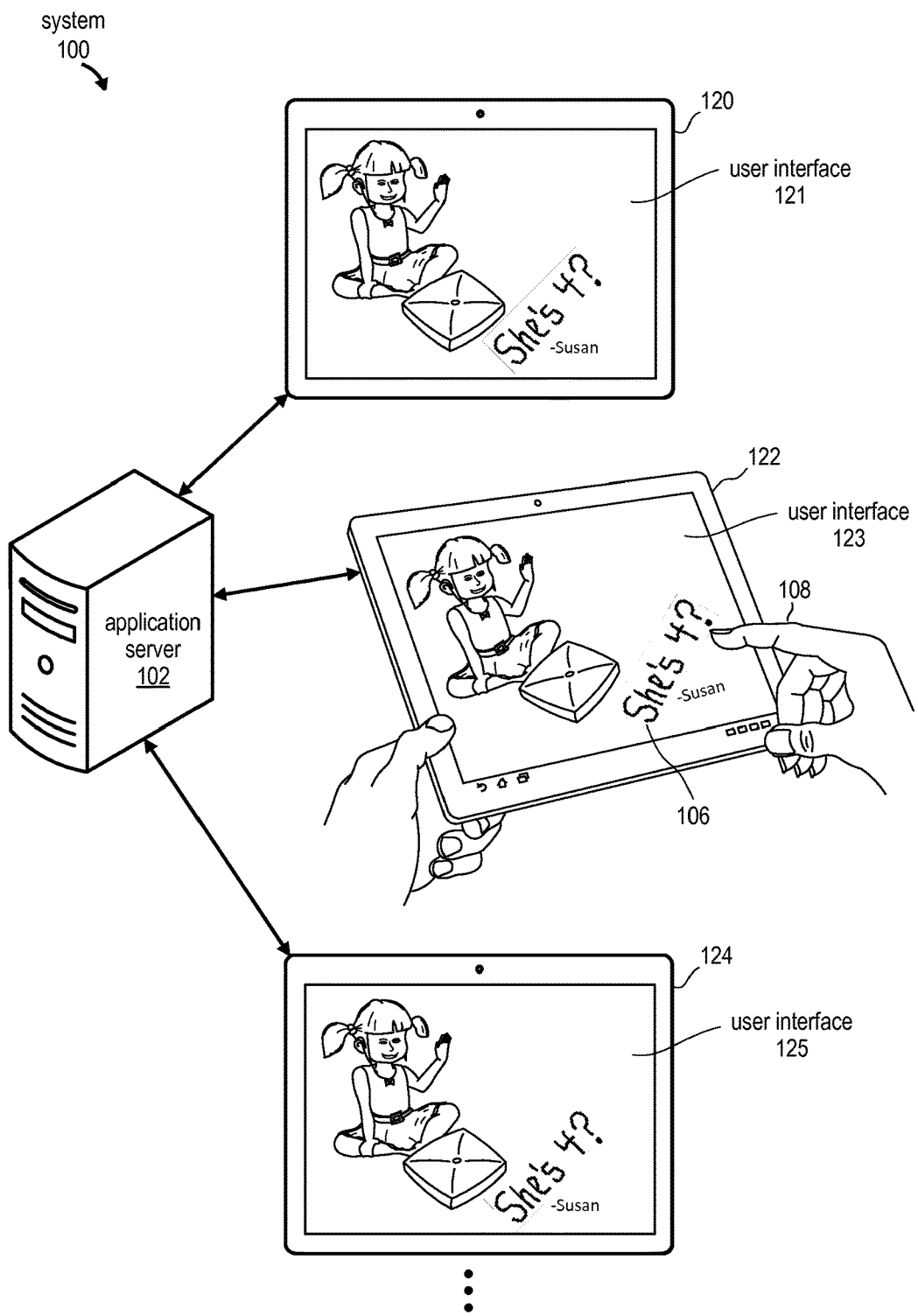
FIG. 1 is a conceptual diagram of an example system to manage sharing of media content (e.g., a presentation, a video, etc.), in accordance with the technologies described herein.

FIG. 1 is a conceptual diagram of an example system 100 to manage sharing of media content (e.g., a presentation, a video, etc.), in accordance with the technologies described herein. In this example, the application server 102 provides (e.g., multicasts) media content to multiple client computers, including a client computer 120, a client computer 122, and a client computer 124. The media content depicted in FIG. 1 is a little girl sitting down in front of a cushion and waving. The media content displays on a user interface 121 of the client computer 120, a user interface 123 of the client computer 122, and a user interface 125 of the client computer 124.

During the joint viewing session of the media content, the application server 102 can receive, from a client computer, requests for annotating and/or commenting. For example, a user may use an input device (e.g., keyboard, computer mouse, touch-screen, touchpad, etc.) to make an annotation and/or comment while the application server 102 is providing (e.g., multicasting) the media content. A user may provide the annotation or comment in several different ways, such as an annotation drawing, an annotation text, an annotation bubble, and/or a comment frame, among other ways. The application server 102 receives the annotation or comment from the client computer. The application server 102 provides (e.g., multicasts) the annotation and/or comment to the client computers. The client computers display the annotation and/or comment on their respective screens substantially immediately (e.g., real time) or with a manageable amount of differences between download-times at the client computers. Bandwidths among the client computers should be sufficiently high to enable the presentation to be displayed on the client computers at the substantially same time (e.g., at or close to real time), or displayed on the client computers with a manageable amount of differences between download-times at the client computers. A download-time difference is a difference between a download-time at one client computer and a download time at another client computer.

For explanatory purposes, FIG. 1 shows an annotation 106 that originates on a touch-screen of the client computer 122. A finger 108 of a user Susan contacts the touch-screen to draw the annotation 106 that reads, "She's 4?" The client computer 122 sends the annotation 106 to the application server 102. The application server 102 receives the annotation 106 and formats the annotation 106 appropriately. As one example, the application server 102 formats the annotation 106 by attaching the username "Susan." The application server 102 then sends to the client computers a multicast of the formatted annotation. The client computers display the formatted annotation along with the media content.

In some implementations, the application server 102 can format the media content, presentation, and/or video according to display options. A display option provides a guideline for how the application server 102 should format the media content, annotations, and/or comments. The application server typically receives the display options from a client computer that is designated as the leader's client computer. Any of the client computers 120, 122, or 124 may be the leader's client computer. The application server 102 receives from the leader's client computer one or more requested display options. As one example, a requested display option may include a request for enabling annotations, while disabling comments. These and other features are further discussed below.

Presentations: Annotating and Commenting During a Collaboration Session

Figure 2:
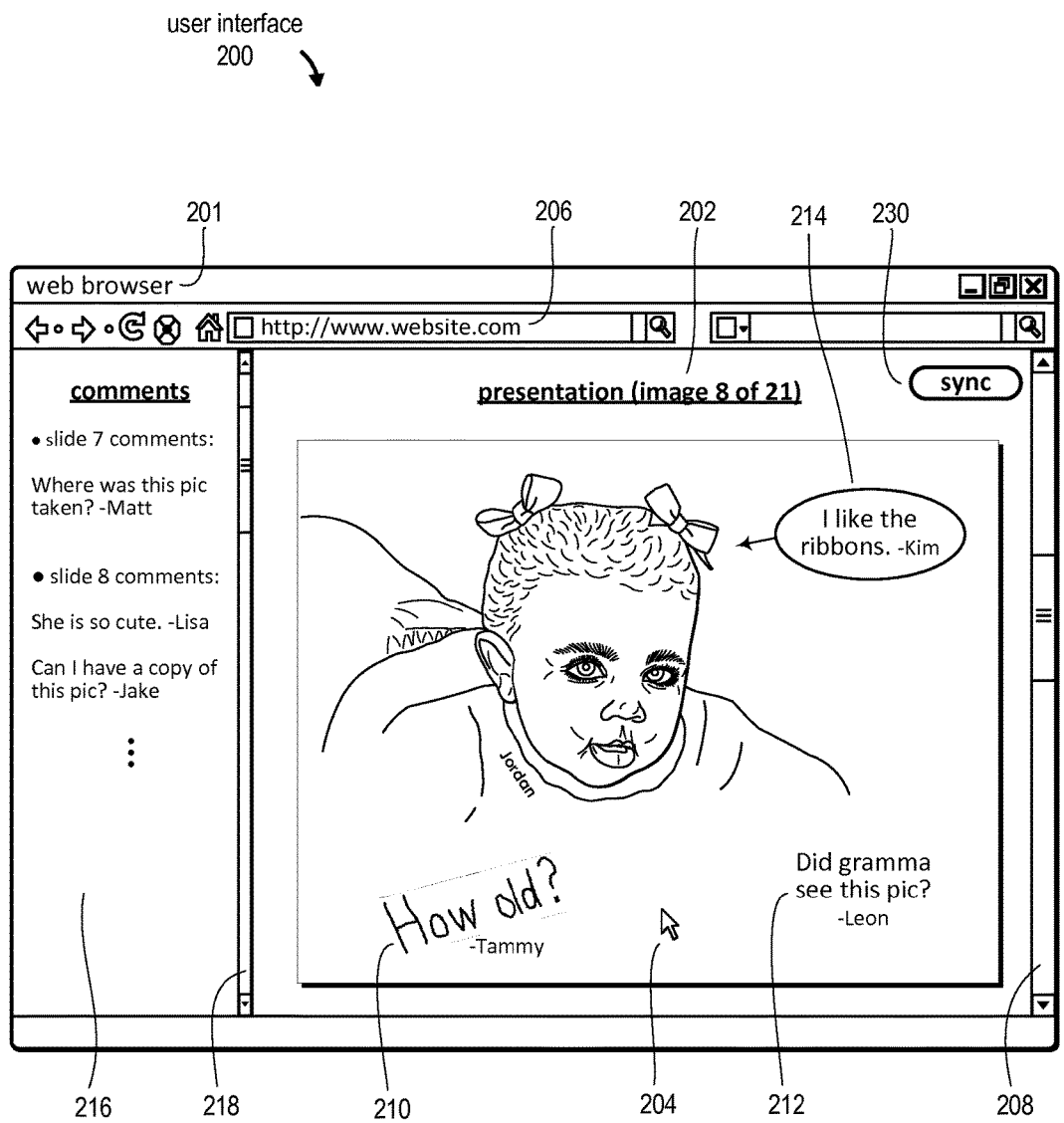
FIG. 2 is an example user interface to collaborate on a presentation, in accordance with the technologies described herein.

FIG. 2 is an example user interface 200 used to collaborate on a presentation 202, in accordance with the technologies described herein. A presentation includes one or more images for showing and explaining a topic to an audience. Presentations may exist in many forms. For example, there are sales presentations, informational presentations, motivational presentations, first encounters, interviews, briefings, status reports, image building, and/or training sessions, among other types. Although people often think of presentations in a business context, presentations may be more of a personal nature.

In this example, the presentation 202 includes a series of 21 total images, which show and explain events of a family vacation. The user interface 200 currently shows image number 8 of the 21 total images. This image 8 includes a baby "Jordan."

An application server (e.g., the application server 102 of FIG. 1) sends to client computers a multicast of the presentation 202 for display on the user interface 200. In this example, the user interface 200 includes a web browser 201 for showing the presentation 202. A user may access the collaboration system by entering a URL (uniform resource locator) 206 into the web browser 201. The user interface 200 shows the URL 206 as "http://www.website.com" for explanatory purposes. The URL 206 may include a reference to a software application of the collaboration system. The application server (e.g., the application server 102 of FIG. 1) manages such a software application. The user interface 200 includes devices that allow a user to interact with the collaboration software managed by the application server. A user may interact with features of the user interface 200 by using a pointing indicator 204, among other devices.

A user may provide the annotation or comment in several different ways, such as an annotation drawing 210, an annotation text 212, an annotation bubble 214, and/or a comment frame 216, among other ways. For example, the annotation drawing 210 may have originated from a pointing indicator 204 coupled to a computer mouse, a trackball, a touchpad, a track stick, a joystick, or cursor direction keys, among other devices. Alternatively, the annotation drawing 210 may have originated from a touch-screen coupled to a stylus or finger. For example, by using a client computer, a user identified as "Tammy" makes an annotation drawing that reads, "How old?" The client computer sends the annotation drawing to the application server (e.g., the application server 102 of FIG. 1).

The application server receives the annotation drawing and formats the annotation drawing appropriately. For example, the application server can format the annotation drawing by attaching the username "Tammy". Other formatting examples are discussed below with reference to FIG. 6. The application server then sends to the client computers a multicast of the formatted annotation drawing 210. Each client computer in the collaboration session can then display the annotation drawing 210 on the presentation 202, as shown in FIG. 2. Another example of such multicasting is discussed above with reference to FIG. 1.

In another example, the annotation text 212 of FIG. 2 may have originated from a laptop keyboard, a desktop keyboard, a graphical keyboard on a touch screen, among other devices. For example, by using a client computer, a user identified as "Leon" types an annotation text that reads, "Did gramma see this pic?" The client computer sends the annotation text to the application server (e.g., the application server 102 of FIG. 1). The application server receives the annotation text and formats the annotation text appropriately. For example, the application server formats the annotation text by attaching the username "Leon." The application server then sends to the client computers a multicast of the formatted annotation text 212. Each client computer in the collaboration session can then display the annotation text 212, as shown in FIG. 2.

In yet another example, the annotation bubble 214 of FIG. 2 may have originated from a laptop keyboard, a desktop keyboard, a graphical keyboard on a touch screen, among other devices. For example, by using a client computer, a user identified as "Kim" types an annotation bubble that reads, "I like the ribbons?" The client computer sends the annotation bubble to the application server (e.g., the application server 102 of FIG. 1). The application server receives the annotation bubble and formats the annotation bubble appropriately. For example, the application server formats the annotation bubble by attaching the username "Kim". The application server then sends to the client computers a multicast of the formatted annotation bubble 214. Each client computer in the collaboration session can then display the annotation bubble 214, as shown in FIG. 2.

In still yet another example, the application server (e.g., the application server 102 of FIG. 1) provides a comment frame 216 for display on the user interface 200. The comment frame 216 enables the application server to receive comments from client computers in an organized manner that may be more desirable to the collaborating parties. In this example, the application server conveniently organizes the comments according to the slides in a comment frame 216 that is located to the left of the main frame showing the presentation 202. In other implementations, the comment frame may be at any appropriate location, such as below the presentation 202, to the right of the presentation 202, or above the presentation 202.

The comment frame 216 currently shows comments associated with slides 7 and 8. A comment associated with slide 7 reads, "Where was this pic taken?", from a user identified as "Matt." A comment associated with slide 8 reads, "She is so cute", from a user identified as "Lisa." Another comment associated with slide 8 reads, "Can I have a copy of this pic?", from a user identified as "Jake."

Each of these comments in the comment frame 216 may have originated from a laptop keyboard, a desktop keyboard, a graphical keyboard on a touch screen, and/or from another device. For example, by using a client computer, the user identified as "Matt" types a comment in a comment frame on his client computer that reads, "Where was this pic taken?" The client computer sends the comment to the application server (e.g., the application server 102 of FIG. 1).

The application server receives the comment and formats the comment appropriately. For example, the application server can format the comment by associating the comment with slide 7, organizing the comment chronologically relative to other comments received from other client computers, and attaching the user name "Matt." Other formatting examples are discussed below with reference to FIG. 6. The application server then sends to the client computers a multicast of the formatted comment. Each client computer in the collaboration session can then display the comment in the comment frame 216, as shown in FIG. 2. The application server may handle in a similar manner the comments associated with slide 8 or any other slide.

Presentations: Navigating and Syncing During a Collaboration Session

Referring to FIG. 2, for displaying the presentation 202, the application server sends a multicast to each of the client computers in presentation mode. The application server provides features that enable each user to navigate through the presentation 202 at the user's client computer. For example, the user interface 200 includes a scroll bar 208 that enables the user's client computer to navigate through images of the presentation 202. The user interface 200 also includes a scroll bar 218 that enables the user's client computer to navigate through comments of the comment frame 216. In other implementations, the application server may provide a different style of navigation.

In some implementations, the presentation 202 may have a leader (e.g., presenter), and one or more users who are non-leaders. The leader and each user are associated with their own client computer. The leader's client computer may be referred to as the leader's client computer. The leader's client computer can control, advance, and/or reverse the images of the presentation 202. The application server receives from the leader's client computer requests to navigate through the presentation 202. The application server sends to the client computers the leader's navigation information to the client computers. The leader's navigation information indicates the image state or the animation state of the leader's computer. Each client computer may then update their respective user interfaces to coincide with the leader's navigation information.

The users of the client computers may collaborate while viewing the presentation 202. Each user not only may comment and annotate on the presentation 202, but also may navigate independently through the presentation 202. By using a scroll bar 208, a user may cause a client computer to navigate to any image of the presentation 202. The application server accommodates the actions of the individual client computer appropriately.

One feature is that the leader's computer may be controlling the presentation 202 to display a different image than that of a client computer. The application server provides a sync button 230 on each user interface 200 that enables the user's client computer to synchronize that client computer's display with the display of the leader's client computer. For example, the application server synchronizes that client computer's location in the presentation with the leader's location in the presentation.

A benefit of the navigation functionality is a user may scroll or scrub backward through the various images (e.g., images that have been presented already), in case the user accidentally missed something. The scroll bar 208 may be more suitable for navigating through a presentation 202 than other controls intended for navigating through a video.

When the application server synchronizes two or more computers (e.g., the leader's client computer and a user's client computer), it is desirable for the synchronized computers to display the presentation at the substantially same time. Accordingly, bandwidths among the client computers should be sufficiently high to enable the presentation to be viewable on the client computers at the substantially same time (e.g., real time), or viewable on the client computers with a manageable amount of differences between download-times at the client computers.

Each client computer displays a version of the presentation that is appropriate for the particular client computer. For example, the application server may provide additional functionality to the leader's client computer that is not available to the other client computers, as discussed below with reference to FIG. 6. In addition, the application server provides collaboration functionality that is platform independent. For example, a laptop computer may be running a web browser that is different from a web browser running on a cell phone with a smaller screen. The presentation 202 of FIG. 2 and the comment frame 216 can run on a laptop's web browser as well as a cell phone's web browser, among other devices.

Videos: Annotating and Commenting During a Collaboration Session

Figure 3:
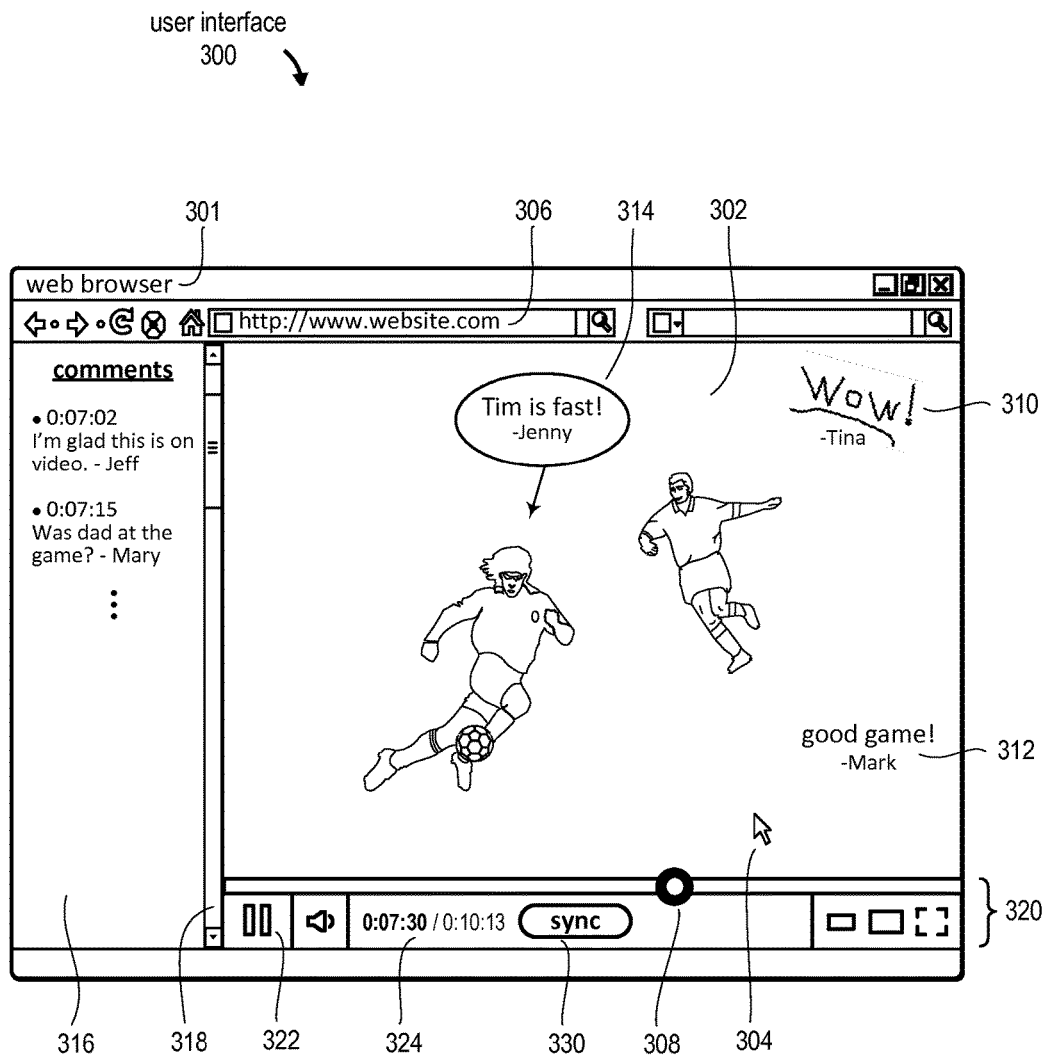
FIG. 3 is an example user interface to collaborate on a video, in accordance with the technologies described herein.

FIG. 3 is an example user interface 300 to collaborate on a video 302, in accordance with the technologies described herein. A video includes a sequence of images representing one or more scenes. In this example, the video 302 currently shows a midpoint of a soccer game. In some implementations, an application server (e.g., the application server 102 of FIG. 1) can manage video-collaboration in a similar manner to presentation-collaboration, which is discussed above with reference to FIG. 2.

An application server (e.g., the application server 102 of FIG. 1) sends to client computers a multicast of the video 302 for display on the user interface 300. Like the user interface 200 of FIG. 2, the user interface 300 of FIG. 3 includes a web browser 301. However, the user interface 300 is for showing the video 302. A user may access the collaboration system by entering a URL 306 into the web browser 301. A user may interact with features of the user interface 300 by using a pointing indicator 304, among other devices.

Many features of the presentation-collaboration of FIG. 2 are transferrable to the video-collaboration of FIG. 3. For example, a user may provide an annotation or a comment in several different ways, such as an annotation drawing 310, an annotation text 312, an annotation bubble 314, and/or a comment frame 316, among other ways. The annotation drawing 310 reads, "Wow!", and is associated with a user identified as "Tina." The annotation text 312 reads, "good game!", and is associated with a user identified as "Mark." The annotation bubble 314 reads, "Tim is fast!", and is associated with a user identified as "Jenny."

Further, the comment frame 316 of FIG. 3 is similar in operation to the comment frame 216 of FIG. 2. However, in this example of FIG. 3, the application server conveniently organizes the comments according to clock times of the video 302. The comment frame 316 currently shows comments associated with clock times 0:07:02 and 0:07:15. A comment associated with the clock time 0:07:02 reads, "I'm glad this is on video", from a user identified as "Jeff." A comment associated with the clock time 0:07:15 reads, "Was dad at the game?", from a user identified as "Mary."

Videos: Navigating and Syncing During a Collaboration Session

Referring to FIG. 3, for displaying the video 302, the application server sends a multicast to each of the client computers in video mode. The application server provides features that enable each user to navigate through the video 302 at the user's client computer. For example, the user interface 300 includes a video-controller 320 that enables the user's client computer to navigate through and control playback of the video 302. The user interface 300 also includes a scroll bar 318 that enables the user's client computer to navigate through comments of the comment frame 316. In other implementations, the application server may provide a different style of navigation.

The video-controller 320 includes a video-clock 324, a scrubber 308, a pause button 322, and a sync button 330, among other features. The pause button 322 toggles with a play button (not shown) depending on the state of the playback. While the video 302 is in a state of play, the application server provides the pause button 322, which enables the user's client computer to pause the video 302 by using a pointing indicator 304. While the video 302 is in a state of pause, the application server provides the play button (not shown), which enables the user's client computer to resume play of the video 302 by using the pointing indicator 304.

In some implementations, the video 302 may have a leader, and one or more users who are non-leaders. The leader and each user are associated with their own client computer. The leader's client computer may be referred to as the leader's client computer. The leader's client computer can navigate through and control playback of the video 302. The application server receives from the leader's client computer requests to navigate through and control playback of the video 302. The application server sends to the client computers the leader's navigation information to the client computers. The leader's navigation information indicates the playback location and playback state of the leader's computer. Each client computer may then update their respective user interfaces to coincide with the leader's navigation information.

The users of the client computers may collaborate while viewing the video 302. Each user not only may comment and annotate on the video 302, but also may navigate independently through the video 302. By using a scrubber 308, a user may cause a client computer to navigate to any location of the video 302. The application server accommodates the actions of the individual client computer appropriately.

As one feature, the leader's computer may also be controlling the video 302 to display a different location than that of a client computer. The application server provides a sync button 330 on each user interface 300 that enables the user's client computer to synchronize that client computer's display with the display of the leader's client computer. For example, the application server synchronizes that client computer's location in the video with the leader's location in the video.

A benefit of the navigation functionality is a user may scroll or scrub backward through the video (e.g., part of the video that has already undergone playback), in case the user accidentally missed something. The scrubber 308 may be more suitable for navigating through a video 302 than other controls intended for navigating through a presentation.

When the application server synchronizes two or more computers (e.g., the leader's client computer and a user's client computer), it is desirable for the synchronized computers to display the video at the substantially same time. Accordingly, bandwidths among the client computers should be sufficiently high to enable the presentation to be displayed on the client computers at the substantially same time (e.g., at or close to real time), or displayed on the client computers with a manageable amount of differences between download-times at the client computers.

Each client computer displays a version of the video that is appropriate for the particular client computer. For example, the application server may provide additional functionality to the leader's client computer that is not available to the other client computers, as discussed below with reference to FIG. 6. In addition, the application server provides collaboration functionality that is platform independent. For example, a laptop computer may be running a web browser that is different from a web browser running on a cell phone with a smaller screen. The video 302 of FIG. 3 and the comment frame 316 can run on a laptop's web browser as well as a cell phone's web browser, among other devices.

The application server may enable the leader's client computer to set the duration for which a client computer displays an annotation. For example, an option from the leader's computer may call for the application server to fade an annotation after the specified duration (e.g., 10 seconds or another duration). Accordingly, every time the application server receives an annotation, the application provides (e.g., multicasts) the particular annotation and fades the annotation after the specified duration.

Treating a Collaboration Session as Transient or Recorded

Figure 4:
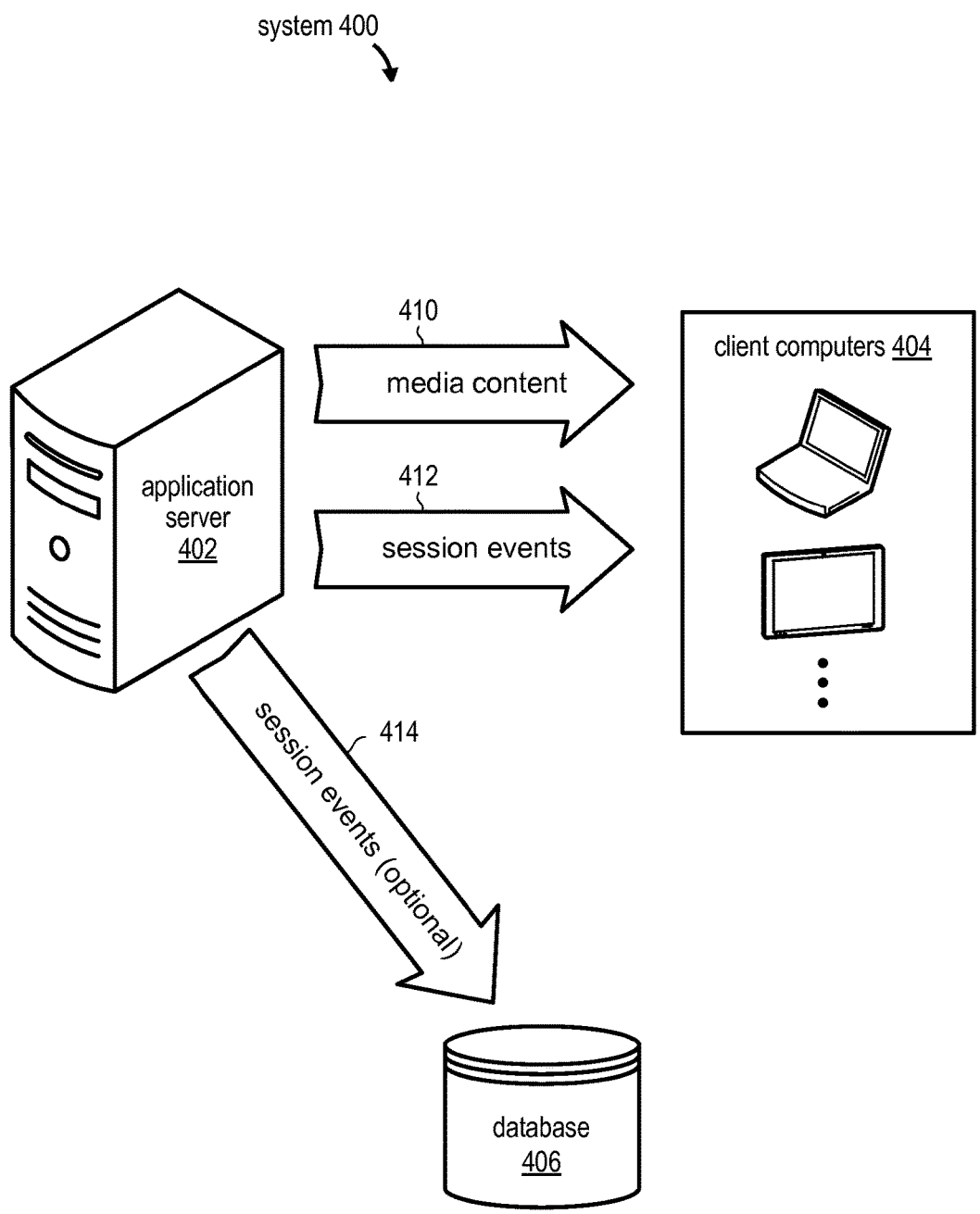
FIG. 4 is a conceptual diagram of an example system to manage a collaboration session for media content among client computers, in accordance with the technologies described herein.

FIG. 4 is a conceptual diagram of an example system 400 to manage a collaboration session for media content among client computers 404, in accordance with the technologies described herein. An application server 402 is coupled to the client computers 404 and a database 406. The application server 402 can treat a collaboration session as being transient or recorded.

Where a collaboration session is transient, the application server 402 treats session events 412 (e.g., annotations, comments, etc.) as being transient. The application server 402 does not provide a dedicated storage for the session events 412. For example, once the application server 402 has completed multicasting of media content 410 (e.g., a presentation, a video, etc.) and session events 412, the application server 402 does not provide a dedicated storage for the session events 412. In a transient collaboration session, the application server 402 is not configured to reference the session events for future reference. A transient collaboration session may be desirable where storage space, bandwidth, and/or other resources are limited, or may be desirable where privacy is a sensitive issue.

In contrast, where a collaboration session is recorded, the application server 402 stores session events 414 (e.g., annotations, comments, etc.) in a database 406. Note the media content (e.g., a presentation, a video, etc.) is already stored in a database. Accordingly, the application server 402 provides a dedicated storage for the session events 414 in the database 406. The session events 412 that the application server 402 provides (e.g., multicasts) to the client computers 404 are the same, or substantially the same, as the stored session event 414.

In some implementations, the application server 402 may store session events 414 and media content 410 as combined media content in the database 406. The application server 402 can then provide that combined media content for reviewing at some future time. In other implementations, the application server 402 can store the session events 414 as a separate layer and associate the media content by using image identifications or clock times, among other associations. The application server 402 can also associate multiple sessions of stored session events 414 with the media content 410. The application server 402 can serve to a client computer any mix of stored session events 414 with the media content 410.

Logging into a Collaboration Session

Figure 5:
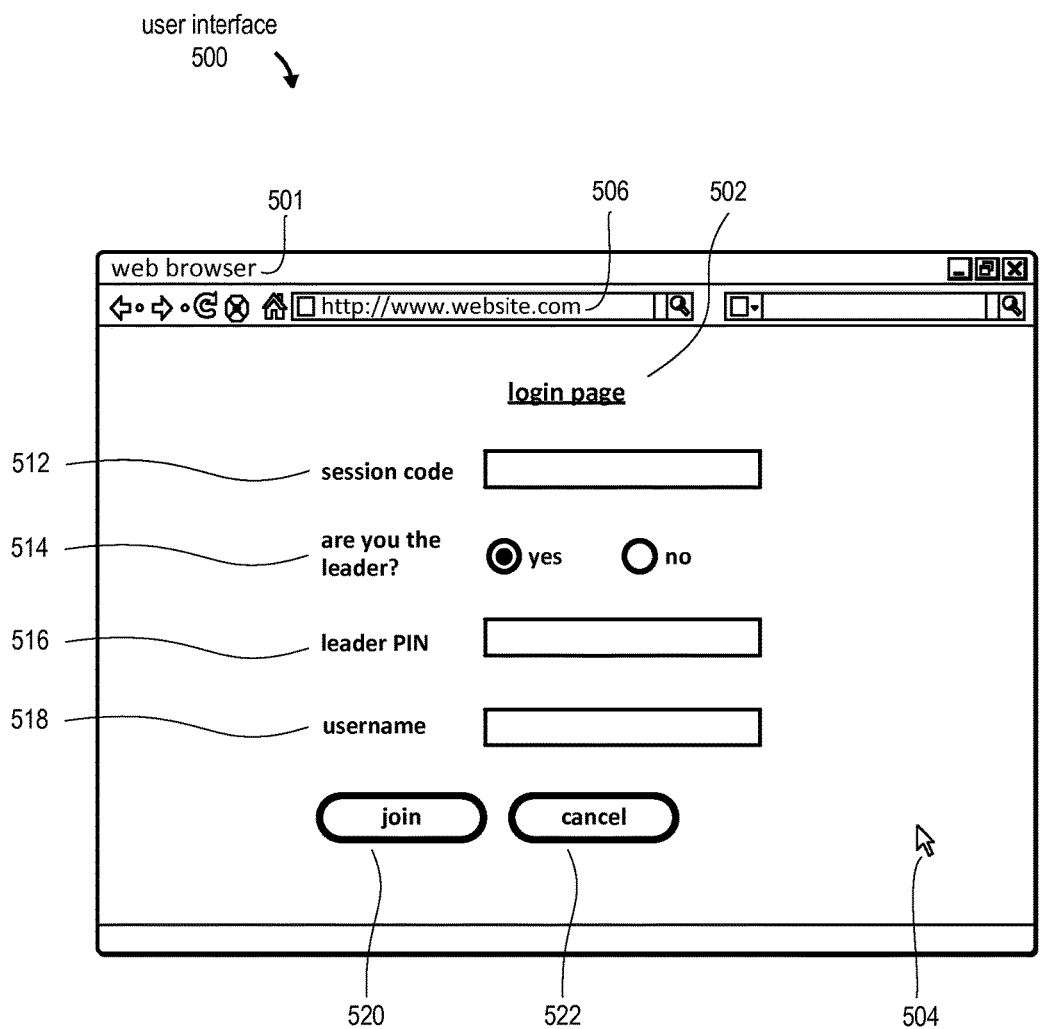
FIG. 5 is an example user interface for an example login page of a system to manage sharing of media content, in accordance with the technologies described herein.

FIG. 5 is an example user interface 500 for an example login page 502 of a system to manage sharing of media content, in accordance with the technologies described herein. The login page 502 is an example of a user's portal of entry into the collaboration system. The application server (e.g., the application server 102 of FIG. 1) can manage security of a collaboration session by using a login page 502 and/or other security devices. The login page 502 also enables the application server to facilitate organization of the client computers and/or the users associated with the client computers.

A user may access the login page 502 by entering a URL (uniform resource locator) into a web browser 501 at the user's client computer. The user interface 500 shows the URL 506 as "http://www.website.com" for explanatory purposes. The URL 506 may include a reference to the login page 502 of a software application of the collaboration system. A user may select features of the login page 502 by using a pointing indicator 504, among other devices.

In this example, the login page 502 shows requests for entering a session code 512, a leader confirmation 514, a leader PIN (personal identification number) 516, a username 518, a join button 520, and a cancel button 522. A user of the collaboration system may reserve a collaboration session by a setting a session code 512 at the application server. The user can inform others of the session code, a time, and a date for collaboration. Each invited user can enter a collaboration session by entering the session in the field for the session code 512 at their respective login page 502 at the user's client computer. A leader of a collaboration session may answer "yes" to the question for the leader confirmation 514 and enter an appropriated code in the field for the leader PIN 516. A user entering the system may enter a name in the field for the username 518. The application server will use the name provided for the username 518 to associate that user with annotations and/or comments. When the user is ready to join a collaboration session, the user may press the join button 520. If the user decides not to join, the user may press the cancel button 522.

Options for a Collaboration Session

The application server (e.g., the application server 102 of FIG. 1) can format session events (e.g., annotations, comments, etc.) according to options for display at the client computers. An option defines how the application server is to modify a session event for display at the client computers. An option can define display modes, enablement modes, annotation durations, colors, fonts, sizes, and/or positions, among other options. The application server can receive an option from a client computer of the leader or another user. In some implementations, the application server can be pre-configured with default options. Default options may be desirable where, for example, a session has no leader or if a leader finds the default options to be acceptable.

In some implementations, the application server may process an option by modifying a header portion of a session event. For example, the application server may receive request for an annotation from a client computer. The annotation may include, for example, a pic file, a text file, or another form of data. The annotation may include a header portion that defines a font, color, and size for the annotation. The application server can modify the header of the annotation to comport with the options for display. For example, the application server can receive the annotation and modify the font, color, and/or size of the annotation. For instance, the received annotation may include a header that defines the annotation as having a Times font, a blue color, and a size of 40 pixels×20 pixels. The application server may modify the header according to the options such that the formatted annotation has a Calibri font, a red color, and a size of 80 pixels×40 pixels.

There are multitudes of other ways the application can format a session event. The overall point is that the application server can format a session event in a way that causes the formatted session event to be not identical to the session event received from the client computer.

Figure 6:
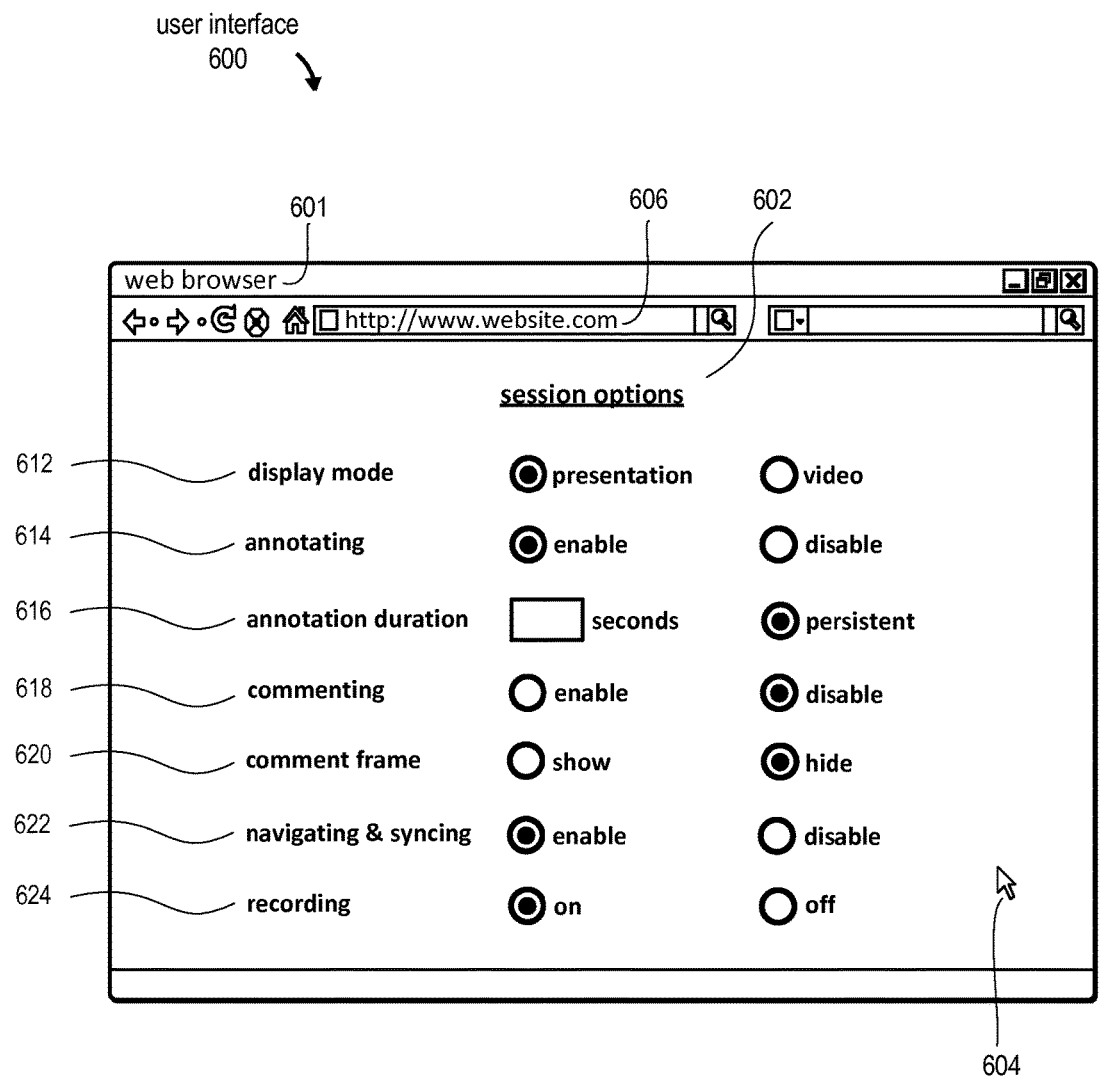
FIG. 6 is an example user interface for example session options of a system to manage sharing of media content, in accordance with the technologies described herein.

FIG. 6 is an example user interface 600 for example session options 602 of a system to manage sharing of media content, in accordance with the technologies described herein. The session options 602 provide examples of options for display at client computers in a collaboration session. Although a collaboration session does not necessarily require a leader, the application server (e.g., the application server 102 of FIG. 1) can provide session options 602 if a leader logs into the collaboration session. Alternatively, the application server may make the session options 602 available to any and/or all participants of a collaboration session. The session options 602 enable a client computer (e.g., leader's computer) to control functionality of a collaboration session for the media content. The session options 602 are an example of options that the application server provides to a client computer of a leader (e.g., presenter) of a collaboration session.

The application server may associate the session options 602 with a URL (uniform resource locator) that is accessible through a web browser 601 at the user's client computer. The user interface 600 shows the URL 606 as "http://www.website.com" for explanatory purposes. The URL 606 may include a reference to the session options 602 of a software application of the collaboration system. A user may select features of the session options 602 by using a pointing indicator 604, among other devices.

In this example, the session options 602 enable a leader's client computer to control a display mode 612, annotating 614, annotating duration 616, commenting 618, a comment frame 620, navigating & syncing 622, and recording 624. These session options 602 are provided for explanatory purposes. In other implementations, the application server may provide other session options that are not shown in FIG. 6.

For the display mode 612, the application server provides optional modes of "presentation" or "video". If the display mode is set to "presentation", then the application server displays the collaboration session in presentation mode. Presentation mode is discussed above with reference to FIG. 2. However, if the display mode is set to "video", then the application server displays the collaboration session in video mode. Video mode is discussed above with reference to FIG. 3.

For the annotating 614, the application server provides options of "enable" or "disable". If the annotating 614 is set to "enable", then the application server enables client computers for annotating in a collaboration session. However, if the annotating is set to "disable", then the application server disables client computers from annotating in a collaboration session.

For the annotating duration 616, the application server provides options a seconds entry and "persistent". If the annotating duration 616 is set for a number of seconds, then the application server displays an annotation for the number of seconds and then fades the annotation. However, if the annotating duration is set to "persistent", then the application server displays annotation persistent until the collaboration session concludes. Annotating duration is discussed above with reference to FIG. 3.

For the commenting 618, the application server provides options of "enable" or "disable". If the commenting 618 is set to "enable", then the application server enables client computers to comment in a collaboration session. However, if the annotating is set to "disable", then the application server disables client computers from commenting in a collaboration session.

For the comment frame 620, the application server provides options of "show" and "hide". If the comment frame 620 is set to "show", then the application server shows a comment frame on user interfaces of client computers during the collaboration session. However, if the comment frame 620 is set to "hide", then the application server does not show a comment frame on user interfaces of client computers during the collaboration session. Commenting frames are discussed above with reference to FIGS. 2 and 3.

For the navigation & syncing 622, the application server provides options of "enable" and "disable". If the navigation & syncing 622 is set to "enable", then the application server enables client computers for navigating through media content and syncing with the leader's user interface. However, if the navigating and syncing 622 is set to "disable", then the application server disables client computers from navigating and syncing. Navigating and synchronizing are discussed above with reference to FIGS. 2 and 3.

For the recording 624, the application server provides options of "on" and "off". If the recording 624 is set to "on", then the application server stores session events (e.g., annotations, comments, etc.) in a database for future reference. However, if the recording 624, is set to "off", then the application server treats a collaboration as transient and does not store session events. Transient and recorded collaboration sessions are discussed above with referent to FIG. 4.

Method Overview

Figure 7:
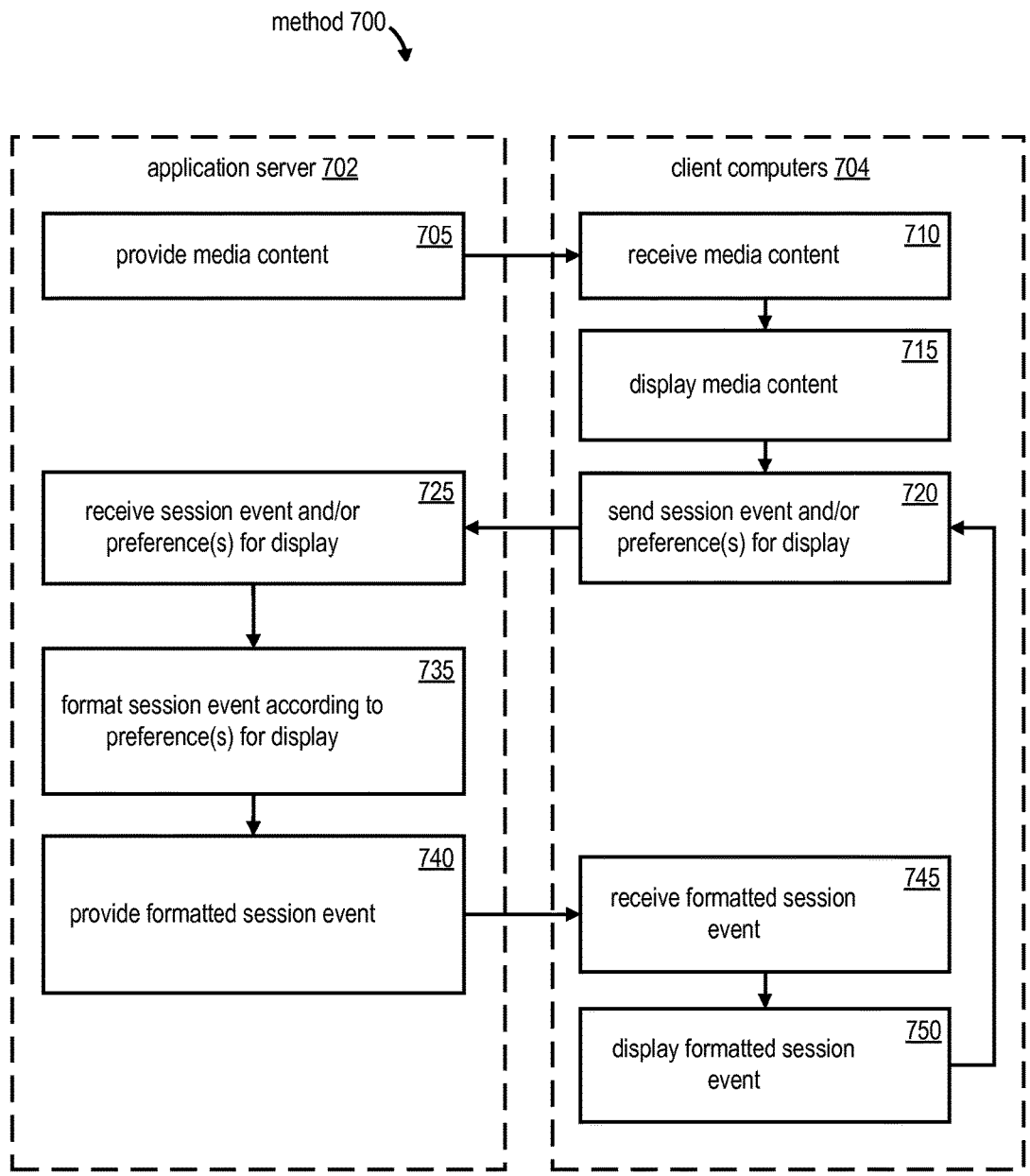
FIG. 7 is a flowchart of an example method to manage sharing of media content among client computers, in accordance with the technologies described herein.

FIG. 7 is a flowchart of an example method 700 to manage sharing of media content among client computers, in accordance with the technologies described herein. In an action 705, the application server 702 provides (e.g., multicasts) to client computers 704 at least some of the media content. The media content may include a presentation, a video, and/or other media content. Note that throughout the method 700, the application server 702 may continue the action 705 of providing (e.g., multicasting) media content as needed.

In an action 710, the client computers 704 receive the media content from the application server 702. Then, in an action 715, the client computers 704 display the media content. Next, in an action 720, a client computer sends to the application server 702 a session event and/or at least one option for display. A session event may include an annotation, a comment, a navigation request, and/or a synchronization request, among other events. An option for display may include, for example, a session option.

Then, in an action 725, the application server 702 receives from a client computer at least one session event or at least one option for display. Next, in an action 735, the application server 702 may format the session event according to at least one option for display at the client computers. For example, the application server 702 may format the requested session event according to at least one session option or other option for display. Next, in an action 740, the application server 702 provides (e.g., multicasts) to the client computer 704 the formatted session event.

Next, in an action 745, the client computers 704 receive the formatted session event. Then, in an action 750, the client computers display the formatted session event on respective user interfaces. Next, the method 700 moves again to the action 720 and continues from there. The method 700 continues until, for example, the collaboration session concludes, there is a network disconnection, or there is a power failure, among other reasons.

This method 700 may include other actions and/or details that are not discussed in this method overview. Other actions and/or details are discussed with reference to other figures and may be a part of the method 700, depending on the implementation.

System Overview

Figure 8:
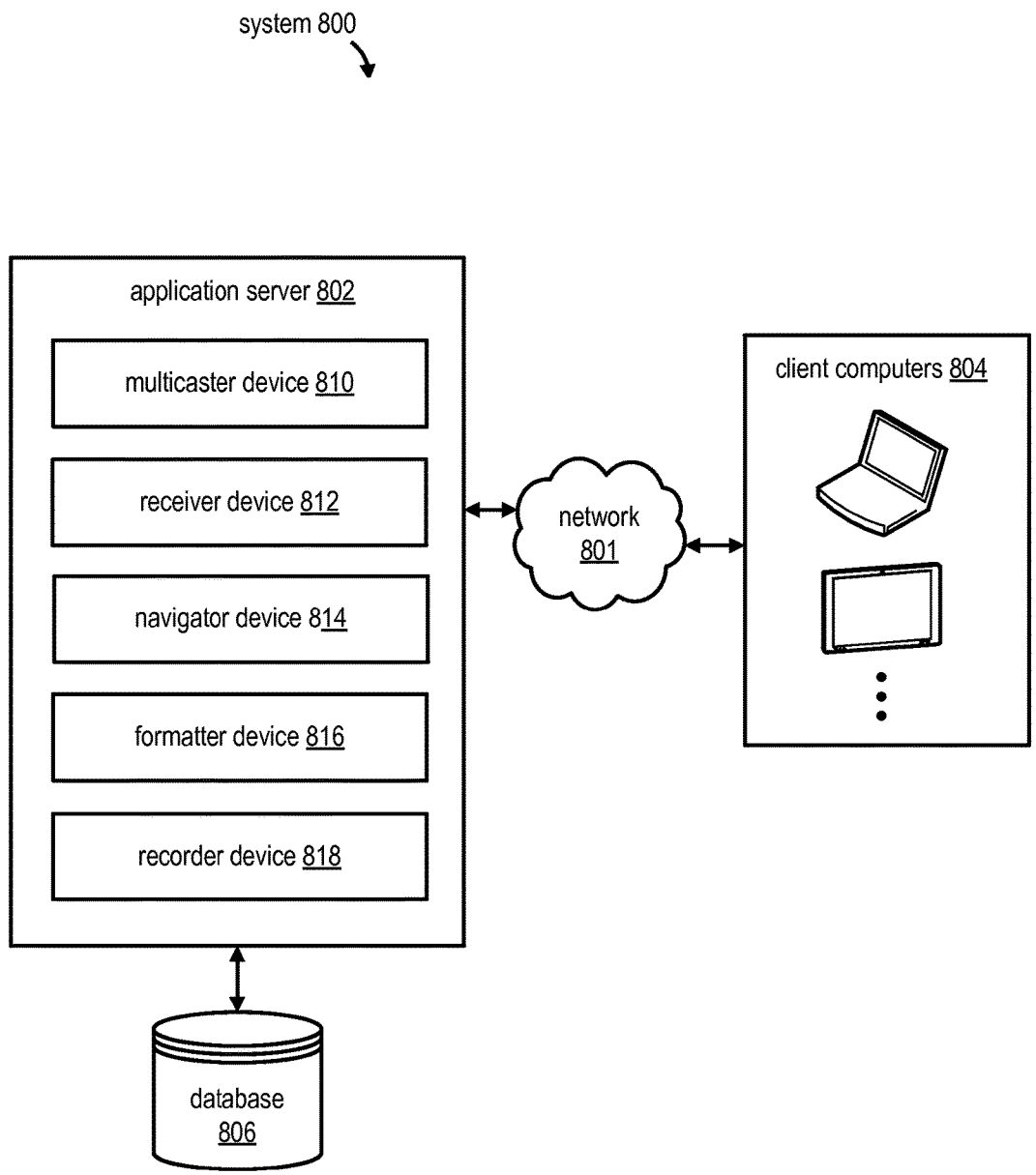
FIG. 8 is a block diagram of an example system to manage sharing of media content among client computers, in accordance with the technologies described herein.

FIG. 8 is a block diagram of an example system 800 to manage sharing of media content among client computers, in accordance with the technologies described herein. In this example, a network 801 couples an application server 802 and client computers 804. The application server 802 is coupled to a database 806.

In this example, the application server 802 includes a multicaster device 810, a receiver device 812, a navigator device 814, a formatter device 816, and a recorder device 818. A client computer may include a laptop computer, a desktop computer, a tablet computer, a cell phone, a smart phone, a mobile phone, and/or a handheld computer, among other devices.

The multicaster device 810 is configured to provide (e.g., multicast) to the client computers 804 media content (e.g., a presentation, a video, etc.) and formatted session events (e.g., annotations, comments, navigation requests, etc.). The receiver device 812 is configured to receive from the client computers 804 requested session events and/or session options. The navigator device 814 is configured to respond to a navigation request and/or a synchronization request received from a client computer. The formatter device 816 is configured to generate formatted session events by formatting the requested session event. The recorder device 818 is configured to store session events in the database 806 for a recorded collaboration session.

A client computer is configured to receive media content and formatted session events. A client computer can display the media content and formatted session on a user interface. A user interface may include, for example, a web browser, among other devices. A device is hardware or a combination of hardware and software.

Example Computer Implementation

Figure 9:
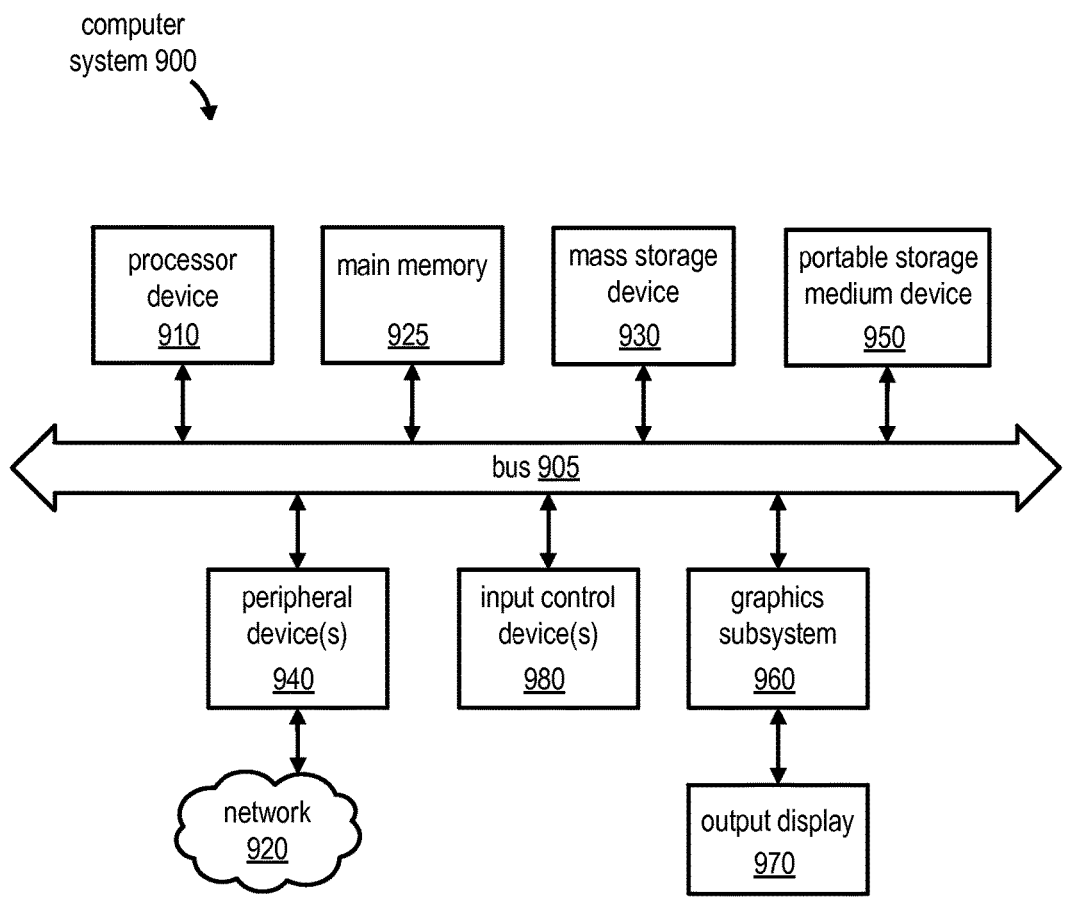
FIG. 9 is a block diagram of a general purpose or special purpose computer system, accordance with the technologies described herein.

FIG. 9 is a block diagram of a general purpose or special purpose computer system 900, accordance with the technologies described herein. The computer system 900 may include, for example, a server, a client computer, a user device, and/or a user computer, among other things.

The computer system 900 preferably includes without limitation a processor device 910, a main memory 925, and an interconnect bus 905. The processor device 910 may include without limitation a single microprocessor, or may include a plurality of microprocessors for configuring the computer system 900 as a multi-processor system. The main memory 925 stores, among other things, instructions and/or data for execution by the processor device 910. If the system is partially implemented in software, the main memory 925 stores the executable code when in operation. The main memory 925 may include banks of DRAM (dynamic random access memory), as well as cache memory.

The computer system 900 may further include a mass storage device 930, peripheral device(s) 940, portable storage medium device(s) 950, input control device(s) 980, a graphics subsystem 960, and/or an output display 970. For explanatory purposes, all components in the computer system 900 are shown in FIG. 9 as being coupled via the bus 905. However, the computer system 900 is not so limited. Devices of the computer system 900 may be coupled through one or more data transport means. For example, the processor device 910 and/or the main memory 925 may be coupled via a local microprocessor bus. The mass storage device 930, peripheral device(s) 940, portable storage medium device(s) 950, and/or graphics subsystem 960 may be coupled via one or more input/output (I/O) buses. The mass storage device 940 is preferably a nonvolatile storage device for storing data and/or instructions for use by the processor device 910. The mass storage device 930, which may be implemented, for example, with a magnetic disk drive or an optical disk drive. In a software implementation, the mass storage device 930 is preferably configured to load contents of the mass storage device 930 onto the main memory 925.

The portable storage medium device 950 operates in conjunction with a nonvolatile portable storage medium, such as, for example, a CD ROM (compact disc read only memory), to input and output data and code to and from the computer system 900. In some implementations, the software may be stored on a portable storage medium, and may be inputted into the computer system 900 via the portable storage medium device 950. The peripheral device(s) 940 may include any type of computer support device, such as, for example, an I/O (input/output) interface configured to add additional functionality to the computer system 900. For example, the peripheral device(s) 940 may include a network interface card for interfacing the computer system 900 with a network 920.

The input control device(s) 980 provide a portion of the user interface for a user of the computer system 900. The input control device(s) 980 may include a keypad and/or a cursor control device. The keypad may be configured to input alphanumeric and/or other key information. The cursor control device may include, for example, a computer mouse, a trackball, a stylus, a touchpad, a track stick, a joystick, and/or cursor direction keys. In order to display textual and graphical information, the computer system 900 preferably includes the graphics subsystem 960 and the output display 970. The output display 970 may include a CRT (cathode ray tube) display and/or a LCD (liquid crystal display). The graphics subsystem 960 receives textual and graphical information, and processes the information for output to the output display 970.

Each component of the computer system 900 may represent a broad category of a computer component of a general and/or special purpose computer. Components of the computer system 900 are not limited to the specific implementations provided here.

Portions of the present technology may be conveniently implemented by using a general purpose computer, a specialized digital computer and/or a microprocessor programmed according to the teachings of the present description, as will be apparent to those skilled in the computer art. Appropriate software coding may readily be prepared by skilled programmers based on the teachings of the present disclosure. Some implementations may also be implemented by the preparation of application-specific integrated circuits or by interconnecting an appropriate network of component circuits.

Some implementations include a computer program product. The computer program product may be a storage medium and/or media having instructions stored thereon and/or therein which can be used to control, or cause, a computer to perform any of the processes of the technology. The storage medium may include without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable storage medium and/or media, some implementations include software for controlling both the hardware of the general and/or special computer or microprocessor, and for enabling the computer or microprocessor to interact with a human user or other mechanism utilizing the results of the technology. Such software may include without limitation device drivers, operating systems, and user applications. Ultimately, such computer readable storage media further includes software for performing aspects of the technology, as described above.

Included in the programming and/or software of the general and/or special purpose computer or microprocessor are software modules for implementing the processes described above. The processes described above may include without limitation the following: providing at least some of the media content from an application server to the client computers, wherein the client computers are coupled for communicating in a collaboration session for the media content; receiving, from a client computer, a requested session event, wherein a session event is at least one of an annotation associated with the media content, a comment associated with the media content, or a navigation request associated with the media content; generating a formatted session event by formatting the requested session event according to at least one option, wherein an option defines how the application server is to modify a session event for display at the client computers; and providing the formatted session event to the client computers for display on user interfaces at the client computers.

In the foregoing specification, the technology has been described with reference to specific implementations thereof. It will, however, be evident that various modifications and changes may be made thereto without departing from the broader spirit and scope of the technology. The specification and drawings are, accordingly, to be regarded in an illustrative rather than a restrictive sense.

What is claimed is:

1. A method to manage sharing of a video among a plurality of client computers, the method comprising:
   initiating, by a processing device of an application server, a collaboration session for presentation of the video, wherein the collaboration session enables real-time collaboration between users of the plurality of client computers;
   providing at least a portion of the video from the application server to the plurality of client computers in the collaboration session, wherein the plurality of client computers are coupled for real-time communication in the collaboration session;
   receiving, from a first client computer of the plurality of client computers, one or more requested collaboration session events associated with the video in the collaboration session, wherein the one or more collaboration session events comprise an annotation on the video, are initiated by a first user of the users of the plurality of client computers during the collaboration session, and are to be presented to one or more other users of the users of the plurality of client computers;

generating a formatted annotation by formatting the annotation received from the first client computer according to at least one user-defined option, wherein the at least one user-defined option is received at the application server from a second client computer of the plurality of client computers, the at least one user-defined option defines how the annotation is to be formatted for real-time display on the video at the client computers, and an appearance of the formatted annotation is different from the annotation received from the first client computer; and providing, in real-time, the formatted annotation to the plurality of client computers for display on the video in user interfaces at the plurality of client computers in the collaboration session.

2. The method of claim 1, wherein the video comprises a presentation, wherein the presentation includes one or more images for showing and explaining a topic to an audience.

3. The method of claim 1, wherein the video includes a sequence of images representing one or more scenes.

4. The method of claim 1, wherein the one or more requested collaboration session events further comprises a comment associated with the video, or a navigation request associated with the video, and wherein the annotation is at least one of an annotation drawing, an annotation text, or an annotation bubble.

5. The method of claim 4, further comprising providing a comment frame for displaying the comment associated with the video, wherein the comment frame includes a scroll bar that enables the client computers to navigate through comments of the comment frame.

6. The method of claim 1, wherein the video comprises a presentation, and wherein the method further comprises providing a scroll bar that enables the client computers to navigate through images of the presentation.

7. The method of claim 1, further comprising providing a video controller that enables the client computers to navigate through images of the video.

8. The method of claim 7, further comprising providing a sync button that enables a user's client computer to synchronize a display of the user's client computer's with a display of a leader's client computer.

9. The method of claim 1, wherein the at least one option includes a session option from a leader's client computer, and wherein the session option enables the leader's client computer to control functionality of the collaboration session for the presentation of the video.

10. The method of claim 1, wherein a predetermined duration of display is received at the application server from the second client computer of the plurality of client computers.

11. The method of claim 1, wherein the application server is pre-configured with at least one default option that is not user defined.

12. A system to manage sharing of a video among a plurality of client computers, the system comprising a processor of an application server that is configured to:

initiate a collaboration session for presentation of the video, wherein the collaboration session enables real-time collaboration between users of the plurality of client computers;

provide at least a portion of the video from the application server to the plurality of client computers, wherein the plurality of client computers are coupled for real-time communication in the collaboration session;

receive, from a first client computer of the plurality of client computers, one or more requested collaboration session events associated with the video in the collaboration session, wherein the one or more collaboration session events comprise an annotation on the video, are initiated by a first user of the users of the plurality of client computers during the collaboration session, and are to be presented to one or more other users of the users of the plurality of client computers;

generate a formatted annotation by formatting the annotation received from the first client computer according to at least one user-defined option, wherein the at least one user-defined option is received from a second client computer of the plurality of client computers, the at least one user-defined option defines how the annotation is to be formatted for real-time display on the video at the client computers, and an appearance of the formatted annotation is different from the annotation received from the first client computer; and provide, in real-time, the formatted annotation to the plurality of client computers for display on the video in user interfaces at the plurality of client computers in the collaboration session.

13. The system of claim 12, wherein the video comprises a presentation, wherein the presentation includes one or more images for showing and explaining a topic to an audience.

14. The system of claim 12, wherein the video includes a sequence of images representing one or more scenes.

15. The system of claim 12, wherein the one or more requested collaboration session events further comprise a comment associated with the video, or a navigation request associated with the video, and wherein the annotation is at least one of an annotation drawing, an annotation text, or an annotation bubble.

16. The system of claim 15, wherein the processor is further configured to provide a comment frame for displaying the comment associated with the video, wherein the comment frame includes a scroll bar that enables the client computers to navigate through comments of the comment frame.

17. The system of claim 12, wherein the video comprises a presentation, and wherein the processor is further configured to provide a scroll bar that enables the client computers to navigate through images of the presentation.

18. The system of claim 12, wherein the processor is further configured to provide a video controller that enables the client computers to navigate through images of the video.

19. The system of claim 18, wherein the processor is further configured to provide a sync button that enables a user's client computer to synchronize a display of the user's client computer's with a display of a leader's client computer.

20. The system of claim 12, wherein the at least one option includes a session option from a leader's client computer, and wherein the session option enables the leader's client computer to control functionality of the collaboration session for the presentation of the video.

21. The system of claim 12, wherein the system is further configured to receive a predetermined duration of display from the second client computer of the plurality of client computers.

22. The system of claim 12, wherein the system is pre-configured with at least one default option that is not user defined.

23. A non-transitory computer-readable storage medium storing instructions that when executed cause a processor to:
- initiate, using an application server, a collaboration session for presentation of a video, wherein the collaboration session enables real-time collaboration between users of a plurality of client computers;
- provide at least a portion of the video from the application server to the plurality of client computers in the collaboration session, wherein the plurality of client computers are coupled for real-time communication in the collaboration session;
- receive, from a first client computer of the plurality of client computers, one or more requested collaboration session events associated with the video in the collaboration session, wherein the one or more collaboration session events comprise an annotation on the video, are initiated by a first user of the users of the plurality of client computers during the collaboration session, and are to be presented to one or more other users of the users of the plurality of client computers;
- generate a formatted annotation by formatting the annotation received from the first client computer according to at least one user-defined option, wherein the at least one user-defined option is received from a second client computer of the plurality of client computers, the at least one user-defined option defines how the annotation is to be formatted for real-time display on the video at the client computers, and an appearance of the formatted annotation is different from the annotation received from the first client computer; and
- provide, in real-time, the formatted annotation to the plurality of client computers for display on the video in user interfaces at the plurality of client computers in the collaboration session.

24. The non-transitory computer-readable storage medium of claim 23, wherein the video comprises a presentation, wherein the presentation includes one or more images for showing and explaining a topic to an audience, and wherein the one or more requested collaboration session events further comprise a comment associated with the presentation, or a navigation request associated with the presentation.

* * * * *